United States Patent [19]
Pardes
[11] 3,883,683
[45] May 13, 1975

[54] HIGH SPEED LINE SCANNER

[75] Inventor: Herman I. Pardes, Wanamassa, N.J.
[73] Assignee: The United States of America as represented by the Secretary of the Army, Washington, D.C.

[22] Filed: July 9, 1963
[21] Appl. No.: 294,795

[52] U.S. Cl. .......... 178/6; 178/7.6; 178/DIG. 2
[51] Int. Cl. .......... H04n 7/00
[58] Field of Search .... 343/7.6; 178/6, 7.6, DIG 2, 178/6.8

[56] References Cited
UNITED STATES PATENTS

| | | | |
|---|---|---|---|
| 3,019,292 | 1/1962 | John | 178/7.6 |
| 3,036,153 | 5/1962 | Day | 178/7.6 |

*Primary Examiner*—Richard A. Farley
*Attorney, Agent, or Firm*—Nathan Edelberg; Robert P. Gibson; Jeremiah G. Murray

EXEMPLARY CLAIM

1. In combination with a moving vehicle a line scanning apparatus secured to the vehicle comprising a main imaging lens to image the subject upon a focal plane, a thin flexible fiber optic unit of sheet-like form having its fibers arranged in the same lateral sequence at its input and output ends and operable to transmit one scan line at a time from said focal plane to an arcuate line at its output end, a driven scanner rotating upon an axis at the center of said arcuate line having at least one scanning lens of short focal length fixed on the scanner to move close to the said arcuate end of the fiber optic unit in focus with the ends of the fibers, means to produce timing signals at the beginning and end of each line scanned, a fixed condenser lens, a mirror fixed to the scanner positioned to reflect light passing through the scanner lens to said condensing lens, a fixed aperture plate acting to reduce the reflected light passing the condenser lens to a small area beam, light sensing means receiving said small beam and communication and reproduction means modulated by the output of said sensing means.

4 Claims, 3 Drawing Figures

INVENTOR,
HERMAN I. PARDES

BY Harry M. Saragovitz,
Edward J. Kelly,
Herbert Berl &
Julian C. Keppler
ATTORNEYS

HIGH SPEED LINE SCANNER

The invention described herein may be manufactured and used by or for the Government for governmental purposes, without the payment of any royalty thereon.

This invention relates to high speed line scanning systems particularly suited to aerial survey activity and wherein the terrain is line scanned transversely to the motion of the aircraft and scanned along the path of the craft by the forward motion thereof. The information bits thus derived are amplified and transmitted via a radio transmitter to a ground station where the image is electronically reconstructed.

A prior known method uses a standard image orthicon tube with electron beam scanning on an axis transverse to the line of flight. This system is not adequate because when used at high speeds the storage characteristic of the tube surface causes a smeared image and loss of resolution.

Prior devices for performing scanning techniques have all been deficient in the respect that their scanning rate has been too slow to provide the required resolution for use in modern high speed aircraft.

The present invention achieves a very high scanning rate and is capable of use in supersonic aircraft. This high speed is possible because a light weight rotating element of small diameter provides the necessary scanning speed. This element may be rotated at very high speeds with a minimum of vibration and bearing wear. The present invention overcomes the defects in existing equipment and provides a system capable of operation at the highest speeds required with efficiency and sustained precision.

Briefly the invention may be described as follows. An image of the area being scanned is formed by a lens, or any optical image forming means, upon a focal plane. This lens is mounted in the aircraft on an axis perpendicular to the terrain. The forward motion of the plane constantly moves the image being formed by the lens.

This moving image is constantly line scanned by a novel mechano-optical system. A thin sheet-like fiber optic element has the receptive end situated in the focal plane and functions to transmit a very thin straight line of the image to the inner end of the optics. This end of the optics is contoured to present the ends of the fibers to an arcuate path whose center lies upon the axis of rotation of the scanning means. The arcuate path is traversed by the driven member of the scanning system. This driven member will herein be termed the scanner and contains a plurality of equally angularly disposed mirror surfaces. The scanner is rotated at very high speed by a suitable motor and has fixedly mounted thereon lenses of the short focus microscope type. Each lens is mounted with its axis radially disposed to the axis of the scanner and positioned to project its image upon one of the mirrors. The objective elements of the lenses are positioned close to the contoured inner end of the fiber optics element and move in a path close to the ends of the fibers of which the fiber optics element is composed.

Thus, it will be observed that as the small aperture of the scanning lenses traverses the fiber optics, a single line of the image at the focal plane picked up by the main imaging lens is scanned and successive small units in the line pass through the scanning lenses, are reflected from the mirrors to a condensing lens and thence through a masking aperture which admits only the small area of the line that is momentarily picked up by the scanning lenses.

The beam which issues from the masking aperture is varying in intensity in accordance with the intensity of the portion of the image being scanned. This modulated beam is detected by a photomultiplier or other suitable device whose output is amplified and transmitted by radio to a ground station where the image is reconstructed in the conventional manner. The forward motion of the aircraft provides the scanning motion along the path of flight. A more comprehensive description of the invention will appear hereinafter.

It is a primary object of the invention to provide a line scanning system capable of accurate high speed, high resolution operation.

A further object of the invention is to provide a scanning system which is capable of high resolution line scanning of ground terrain from a superspeed aircraft.

A further object of the invention is to provide a scanning system wherein the mechano-optical elements are of small dimensions and relatively light in weight which permit them to be driven at very high speed with a minimum of vibration and bearing wear.

A further object of the invention is to provide a superspeed scanning system wherein initial precision of moving parts is maintained substantially constant.

A still further object of the invention is to provide a scanning system wherein electron beam smudge is eliminated.

A still further object of the invention is to provide a scanning system which eliminates electronic complexities associated with systems involving television and which avoids the complexities of photo-processing rescanning systems.

Other objects and features of the invention will more fully appear from the following detailed description and will be particularly pointed out in the claims.

To provide a better understanding of the invention particular embodiments thereof will be described and illustrated in the accompanying drawings, wherein.

Figure 1:
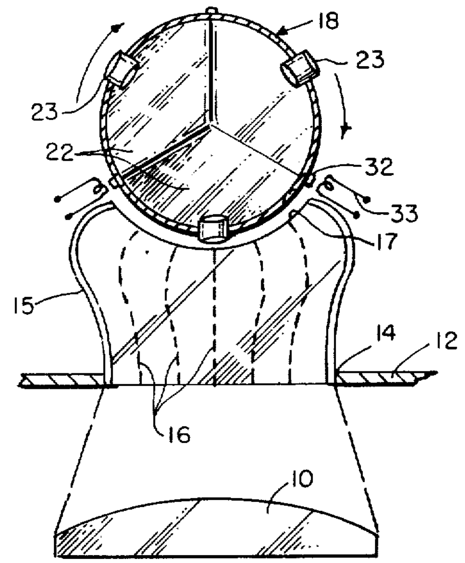
FIG. 1 is a diagrammatic illustration of the apparatus viewed as a side elevation with some parts removed.

The particular embodiment of the invention as shown in the drawings is one which is adapted for use in aircraft for scanning ground terrain. However the invention is adaptable to other specific uses such as in the field of facsimile or photo-transmission. In facsimile operation focusing optics of the correct type would be used and the material to be transmitted would be imaged upon the fiber optics. In this case the document or other subject and the scanner would be given relative movement to completely scan the desired area. Contact scanning is also possible by backlighting the document and holding it flat against the input end of the fiber optic element.

Referring to the drawings the embodiment shown includes a main focusing lens 10 which is mounted in the aircraft, not shown, with its axis vertical to the ground terrain. The lens may be of any suitable type such as one having zoom type focusing means and a focal length suitable for ground scanning.

Figure 2:
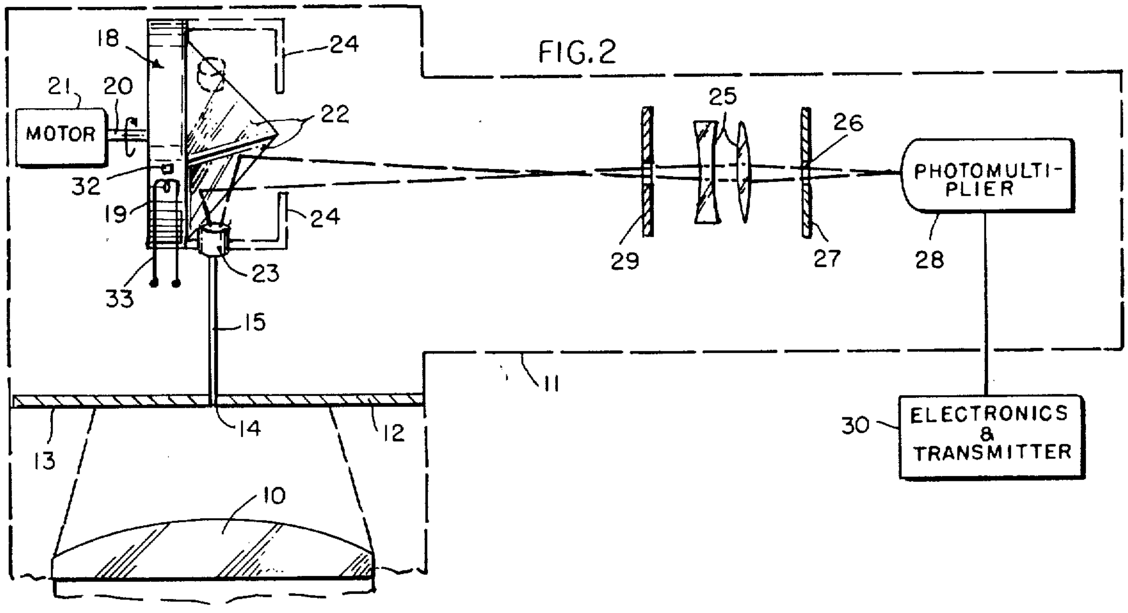
FIG. 2 is a diagrammatic side elevational view of the apparatus as shown in FIG. 1 including the complete system.

The lens and its focusing means are secured to a light impervious casing 11 which incloses the elements of the device and is indicated in dotted lines in FIG. 2. The casing screens out all extraneous light. Other arrangements for this purpose may be made without departing from the invention. One end of the casing is provided with a masking plate 12 secured at the focal pland 13 of the lens. This mask has a narrow slot 14 therein extending diametrically across the width of the format covered by the lens.

A fiber optic member 15 of special design is received in the slot 14. This member 15 is composed of a large number of very small optical fibers 16 secured together at one end thereof to form a thin sheet-like flexible structure which fits into the slot 14 and is of the correct width to fill the slot thus extending completely across the image format. The ends of the fibers present a straight continuous end face which is positioned upon the focal plane 13. The fibers are extended a short distance into the casing 11 and terminate at their inner end upon a circular surface 17 having a radius determined by the dimensions of the driven scanning member 18. Each fiber 16 is located along the surface 17 in the same order of placement that exists at the other ends of the fibers.

In FIG. 1 the position of a few of the fibers is indicated diagrammatically by dotted lines which show the general arrangement of all the fibers since it is not practical to picture all the fibers in the drawing. It will be noted that the ends of fibers at the surface 17 are aligned with a radius extending to the center of the arc defined by the surface.

It will be observed that the optics 15 transfers a narrow line of the image formed by the lens 10 from its normally straight conformation at the focal plane 13 to the arcuate conformation at the surface 17 without distortion or loss of focus. By so doing the optics 15 provides for a highly effective and novel system for scanning at great speed. Since the radius of the arc 17 may be made small of the order of ¾ to 1 inch the rotating scanning element 18 may have a low order of inertia and may be driven at very high speed. Such a mechanism will function with precision throughout a long life.

The scanner 18 desirably has a cylindrical body 19 and is rotated upon the axis 20 of the cylinder by a small high speed motor 21 or any suitable driving means. The axis 20 is positioned perpendicular to the plane of the optics 15 and upon the center of the arcuate surface 17. The radius of the body 19 is slightly smaller than that of the surface 17. A plurality of mirror surfaces 22 are formed upon one end of the scanner. As shown there are three such mirrors symmetrically spaced about the axis 20 of the scanner and disposed at an angle of substantially 45° to the axis. Thus the mirrors form a symmetrical pyramid with its apex upon the axis.

Each of the mirrors have a coacting lens 23 which is of the type used in the optical system in microscopes and have a very short focal length. The lenses are rigidly mounted on and rotate with the scanner with their axes upon a radius of the body 19 extending through substantially the mid point of the mirror surface. A convenient means for mounting the lenses is to provide a sleeve member 24 surrounding and fixed to the body 19. The sleeve provides a light shield to screen out extraneous light from reaching the mirrors and a support in which to mount the lenses 23 which project a short distance outward from the sleeve to a point where the focal plane of the lenses will lie upon the surface 17 of the fiber optic 15. This structure maintains perfect focus throughout the complete line scan. Thus rotation of the scanner produces an optically true line scan no wider than the aperture of the lenses 23 which can be very small.

The projected and enlarged image of the spot being scanned is reflected from the mirrors at 90° to the axis of the lenses 23 and passes to a condensing lens 25 from where it passes through a small aperture 26 in a plate 27 and thence to the photo-sensitive surface of a photo-multiplier tube 28. It may also be desirable to provide an additional light stop 29 placed in front of the lens 25. It will thus be seen that the light reaching the tube 28 is a small beam whose intensity is constantly modulated in accordance with the brightness of the successive small portions of the line scanned by the lenses 23.

The output of the photo-multiplier is fed to an amplifier and transmitter system 30 which transmits the signal to a ground station where the original image is reconstructed in the usual or any desired manner.

The size and shape of the scanner 18 is such as to permit rotational speeds of approximately 36,000 r.p.m. which provides 1800 scans per second which in turn provides a system resolution of the order of 0.2 milliradians in contrast to 1 to 2 milliradians for conventional scanner systems.

Means are provided for timing the start and stop of each scanning sweep. The timing may be accomplished in any desired manner. One suitable means is shown in the drawings wherein small permanent magnets 32 are secured in the sleeve 24 adjacent the junction of the mirror surfaces 22 and coacting therewith are a pair of small pick up coils 33 fixed in position at opposite sides of the optics 15 and close to the periphery of the scanner. In this manner pulses are generated in the coils 33 at the beginning and end of each scan line. These pulses are fed to the amplifier and transmitter along with the output of the tube 28. These timing pulses have identifying characteristics compared to the picture carrying signal and serve to control the reproducing system at the ground station.

A further method for producing sync signals may be achieved by piping light from a source within the apparatus into one or a few fibers at the extreme end limits of the scanning line. This light would be of such intensity that it would cause the electronic components in the amplifying circuits to become saturated and thereby create a peak signal at the start and finish of each scanning sweep.

To sum up the operation of the system the lens 10 focuses an image of the terrain traversed by the aircraft. A narrow line of this image is transposed to the arcuate surface 17 of the fiber optics 15. The remainder of the image is stopped by the plate 12. This line of the image is constantly changed by the forward motion of the aircraft while it is simultaneously scanned by the scanner 18. Each of the lenses 23 upon the scanner picks up the light intensity of each portion of the image contained in the scan line coming from the terrain. This creates a signal from the multiplier tube 28 which in turn is modulated to conform to the changing light intensities along the scanned line. The small opening in the aperture plate passes only the small light beam instantaneously picked up by the lenses 23. The amplified version of the signal is transmitted via a communication link to a ground station where the original image is visually reproduced.

A high resolution infra-red scanner having the same design as that above-described may be constructed when fibers having suitable IR light transmitting characteristics are developed. In this case the photomultiplier would be replaced with an IR detector and the lenses 23 and 25 would either be made of germanium or be of the reflective type.

A feature of the invention resides in the ease of stabilization of the system in an airborne vehicle. Since the fibers 16 of the fiber optics 15 are very flexible it is possible to stabilize the image appearing at the surface 17 by rotating or translating this focal plane in accordance with the roll, pitch or yaw of the vehicle. Since this portion of the system is a very light mass the power required and the weight of a controlling system for this stabilization are very small and insure improved operation of such a system.

Figure 3:
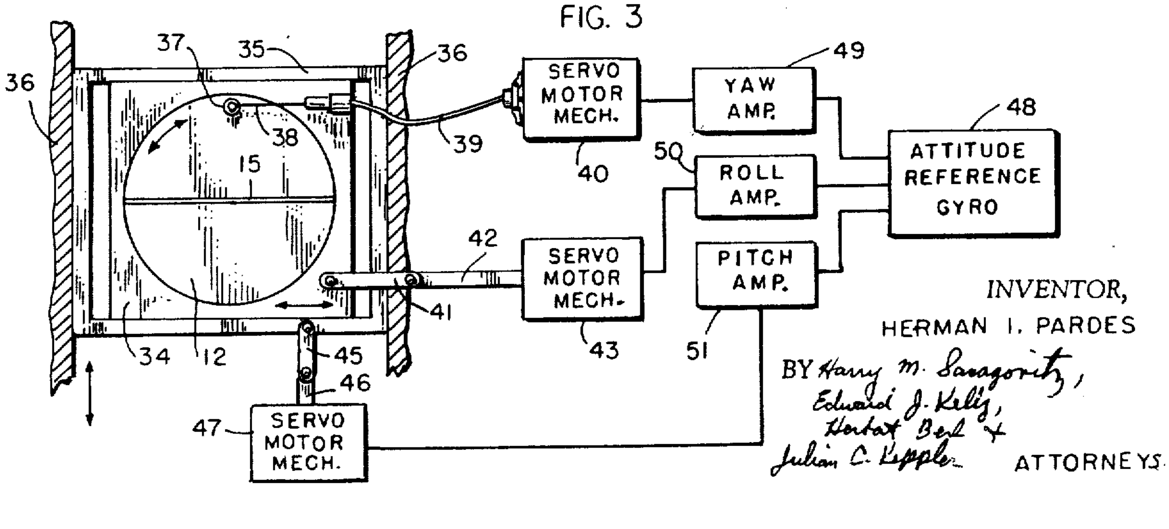
FIG. 3 is a diagrammatic view of a stabilization system for correcting errors introduced by yaw, pitch and roll of the aircraft.

A diagrammatical illustration of such a system is shown in FIG. 3 wherein the arcuate end of the fiber optics 15 is rigidly anchored with respect to the body of the aircraft. The other end of the optics 15 and its masking plate are arranged for rotation in the focal plane 13 and for both vertical and lateral displacement as indicated in FIG. 3.

These motions take place without optical distortion of the image transmitted by the optics 15 and such movement is resisted only by the stiffness of the fibers 16 which is negligible and the slight mechanical friction of the moving parts of the mechanism to be described. The mechanism and its driving components may therefore be small and light in weight requiring only a minimum of power. Since each of the movements takes place in the focal plane 13 the system remains in perfect focus at all times.

Any suitable means may be employed to provide the required correctional movements. An electromechanical system is presented in which the plate 12 is made circular and rotatably received in a second plate 34 which is laterally slidable in a third frame or plate 35 which in turn is vertically slidable in fixed ways 36. The plate 12 is provided with a stud 37 secured therein adjacent its periphery. The inner wire 38 of a conventional Bowden wire assembly is pivotally connected to the stud 37 while the body of the Bowden wire 39 is fixed to the plate 34. The other end of the Bowden wire body is secured to the casing of a servo motor unit 40 while the wire 38 extends into and is actuated by the servo unit.

The plate 34 has a link 41 pivoted thereon which in turn is pivoted to a plunger 42 extending into and driven by a servo unit 43. The plate 35 has a link 45 pivoted thereon the other end of which is pivoted to a plunger 46 extending into and driven by a servo unit 47. Each of the servo units are activated by amplifiers which are in turn triggered by an attitude reference gyro 48. Amplifier 49 corrects for the yaw of the aircraft, amplifier 50 corrects for the aircraft roll and amplifier 51 corrects for the pitch of the aircraft.

Since aircraft roll is manifested by the motion of the image at the focal plane 13 transverse to the direction of flight, correction is accomplished by a compensating motion in an opposite lateral direction. This would be accomplished through the automatic function of the gyro 48, amplifier 50 and servo 43. In a similar manner pitch correction would be accomplished by motion of the plate 34 back and forth in the direction of flight accomplished by the gyro, the amplifier 51 and servo 47. Yaw correction is accomplished by rotation of the plate 12 by the Bowden wire 39 through the action of the servo 40, amplifier 49 and the gyro 48.

What is claimed is:

1. In combination with a moving vehicle a line scanning apparatus secured to the vehicle comprising a main imaging lens to image the subject upon a focal plane, a thin flexible fiber optic unit of sheet-like form having its fibers arranged in the same lateral sequence at its input and output ends and operable to transmit one scan line at a time from said focal plane to an arcuate line at its output end, a driven scanner rotating upon an axis at the center of said arcuate line having at least one scanning lens of short focal length fixed on the scanner to move close to the said arcuate end of the fiber optic unit in focus with the ends of the fibers, means to produce timing signals at the beginning and end of each line scanned, a fixed condenser lens, a mirror fixed to the scanner positioned to reflect light passing through the scanner lens to said condensing lens, a fixed aperture plate acting to reduce the reflected light passing the condenser lens to a small area beam, light sensing means receiving said small beam and communication and reproduction means modulated by the output of said sensing means.

2. In combination with a moving vehicle a line scanning apparatus according to claim 1 and a support for the input end of said fiber optic unit movable with respect to the vehicle in the focal plane of the main focusing lens, an attitude reference gyro fixed in the vehicle, means connected to said gyro including servo motors acting to correcting the attitude of the image scanned when it is shifted by the pitch, yaw and roll of the vehicle by shifting only the position of the fiber optics support.

3. Line scanning apparatus in combination with means for producing relative motion between the subject and the line scanner comprising a lens for imaging the subject upon a focal plane, a thin sheet-like fiber optic unit having a thickness of substantially one scan line and in which the fibers are arranged in the same lateral sequence at its input and output ends, the fiber ends at one end of the unit ending upon the focal plane and at its other end the fibers end upon the arc of a circle, a driven scanner rotatable upon the center of said arc and having fixed thereon at least one short focus lens with its axis upon a radius from the rotational axis and having its focal plane upon said arc, a mirror fixed on the scanner in position to reflect light passing through the lens in a direction at an angle to the incident light, means to produce timing signals at the beginning and end of each line scanned, fixed means to reduce the reflected light to a small stationary beam modulated by the changing light intensities along the line scanned by the scanning lens as it traverses the said arcuate end of the fiber optic unit, light sensing means receiving the reduced light beam, communication and reproducing means modulated by the output of said sensing means operable to reconstruct the image of the subject and light excluding means for protecting the apparatus from extraneous light.

4. Apparatus for line scanning comprising a lens for focusing an image of the subject scanned upon a focal plane, a light excluding casing for housing the appartus and in which said lens is mounted in a wall thereof, a masking plate intercepting light passing through the lens and having a thin straight slot therein extending substantially diametrically across the full width of the lens format, a thin sheet-like flexible fiber optic element having its fibers arranged in the same lateral sequence at its input and output ends, one end of said element extending through and occupying the full area of said slot this end of the element having the ends of all its fibers ending upon the focal plane of the lens, the other end of the fiber optics having the ends of the fibers ending upon an arc of a circle, a driven scanner rotatable on the center of said arc having a plurality of mirrors thereon each mirror having a short focus lens of the microscope type secured to the scanner with its optical axis coinciding with a radius from the scanner axis and passing through the center area of its respective mirror said lens positioned to place its focal plane upon said arc, means to produce timing signals at the beginning and end of each line scanned, a condensing lens positioned to receive the light passing through the mirror lens and reflected from its mirror during its scanning motion along the arcuate end of the fiber optic member, a fixed aperture plate limiting the light from the mirrors and condensing lens to a small area beam and light converting means receiving light issuing from said aperture plate whereby the units of light intensity of each line scan are converted to electrical pulses which are communicated to ground where each line may be reconstructed to continuously reproduce the image of the subject.

* * * * *